Figure 1:
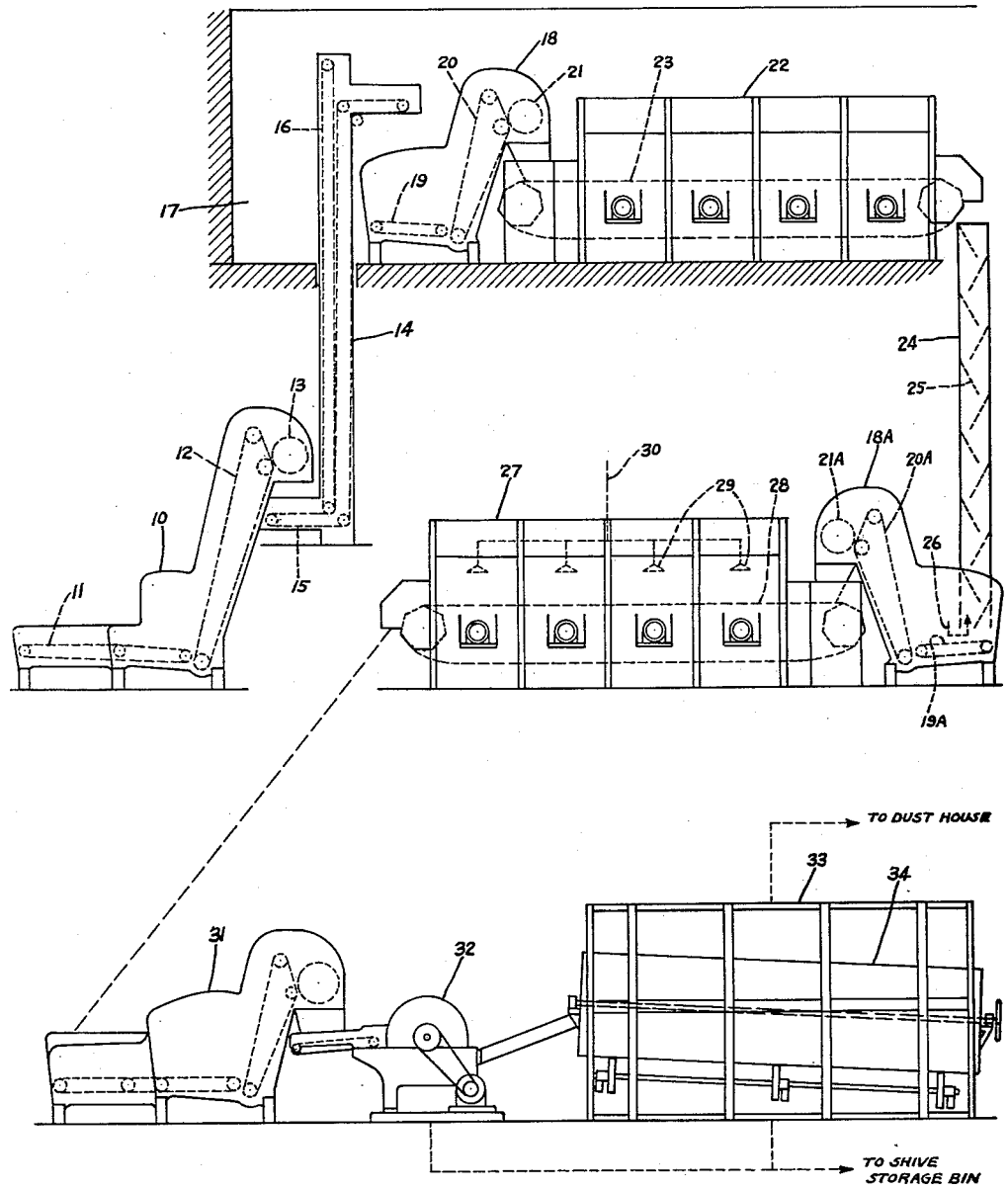

Oct. 25, 1960          L. E. SCHULZE          2,957,209

FIBER CLEANING PROCESS

Filed July 8, 1957          2 Sheets-Sheet 1

INVENTOR.
LEROY E. SCHULZE
BY Moore, White & Burd
ATTORNEYS

United States Patent Office 2,957,209
Patented Oct. 25, 1960

2,957,209

FIBER CLEANING PROCESS

Leroy E. Schulze, 1918 Walden Place NE.,
Minneapolis, Minn.

Filed July 8, 1957, Ser. No. 670,424

14 Claims. (Cl. 19—9)

This invention relates to a method for mechanically cleaning vegetable fibers. More particularly, the invention relates to a process of mechanically cleaning the fibers of mature, field-ripened seed flax straw for paper making and similar uses.

The utilization of seed flax straw has been the subject of investigations by both private and public agencies for many years. It is estimated that in the United States and Canada each year, after harvesting of the flax crop for recovery of its linseed oil and linseed meal values, there remains more than one and one-half million tons of flax straw. A small amount of this straw is gathered and used for manufacturing of cigarette paper and other specialty papers and most of the remainder is a waste product, much of which is burned.

The principal objectives of investigators in this field have been: (1) to find a profitable use for an agricultural by-product which is now largely wasted; (2) to relieve a scarcity of linen rags used in paper making which develops periodically and at times is critical; and (3) to provide new paper making materials. Heretofore these objectives have not been attained.

As early as 1908 the Bureau of Plant Industry of the United States Department of Agriculture began studies on the pulping of fibrous plants for paper making. Although after a period of years a satisfactory substitute for linen rags and good samples of paper were produced on a laboratory scale it was impossible to convert the small scale experiments to commercially feasible methods. The work of the Bureau of Plant Industry was later transferred to the Forest Products Laboratory of the Department of Agriculture. Although much additional government sponsored investigative work has been carried out, the results have been negative from an economic standpoint.

Seed flax is grown primarily for linseed oil production and the flax plant is bred so as to promote disease resistance and maximum seed production. The seed flax plants are preferably short, sturdy, multiple branched plants with numerous seed bolls. Heavy, coarse stems are desirable to support the heavy seed bolls and to prevent lodging. Seed flax plants are allowed to grow to full maturity of the seed with the result that the fibers of the straw become harsh and coarse. Because of thorough ripening the straw becomes brittle and less susceptible to bacterial decomposition and therefore separation of the fibers is more difficult.

In the manufacture of paper products retention of fiber length is of little concern since preparation of paper pulp leads to extreme shortening of fibers to permit better drainage on the wire of the paper making machine. In the making of quality linen papers the presence of some fibers of a length longer than wood pulp fibers is desirable to add strength. Degradation of the fiber by unnecessary digestion of the cellulose due to harsh cooking conditions or high temperatures is to be avoided since it weakens the fibers and reduces the strength and character of the paper. Such severe digestion has in the past necessarily been resorted to in order to pulp the stem ends and shive particles adhering to or mixed with the linen fibers of flax straw decorticated by existing techniques. This has been one of the primary reasons for the failure to achieve a satisfactorily economic process for utilization of flax fibers in paper making.

It is the principal object of this invention to obviate these prior difficulties by providing an economical mechanical cleaning process by which linen fibers of seed flax straw are cleaned and separated from the shive of the flax straw.

It is a further object of this invention to provide a cleaning process for linen fibers from seed flax straw wherein the linen fibers are preferentially treated to condition them for separation from adhering shivey material prior to mechanical fracturing separation and removal of the shivey material.

Another object of this invention is to provide a large capacity, economically feasible, continuous mechanical method of cleaning seed flax straw fibers for use in paper making.

Another object of this invention is to produce a textile fiber suitable for use alone or as a blend with cotton or other fibers in the manufacture of coarser yarn for weaving of draperies, toweling, upholstery or suiting material in which rough texture is a desirable quality.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 1A:
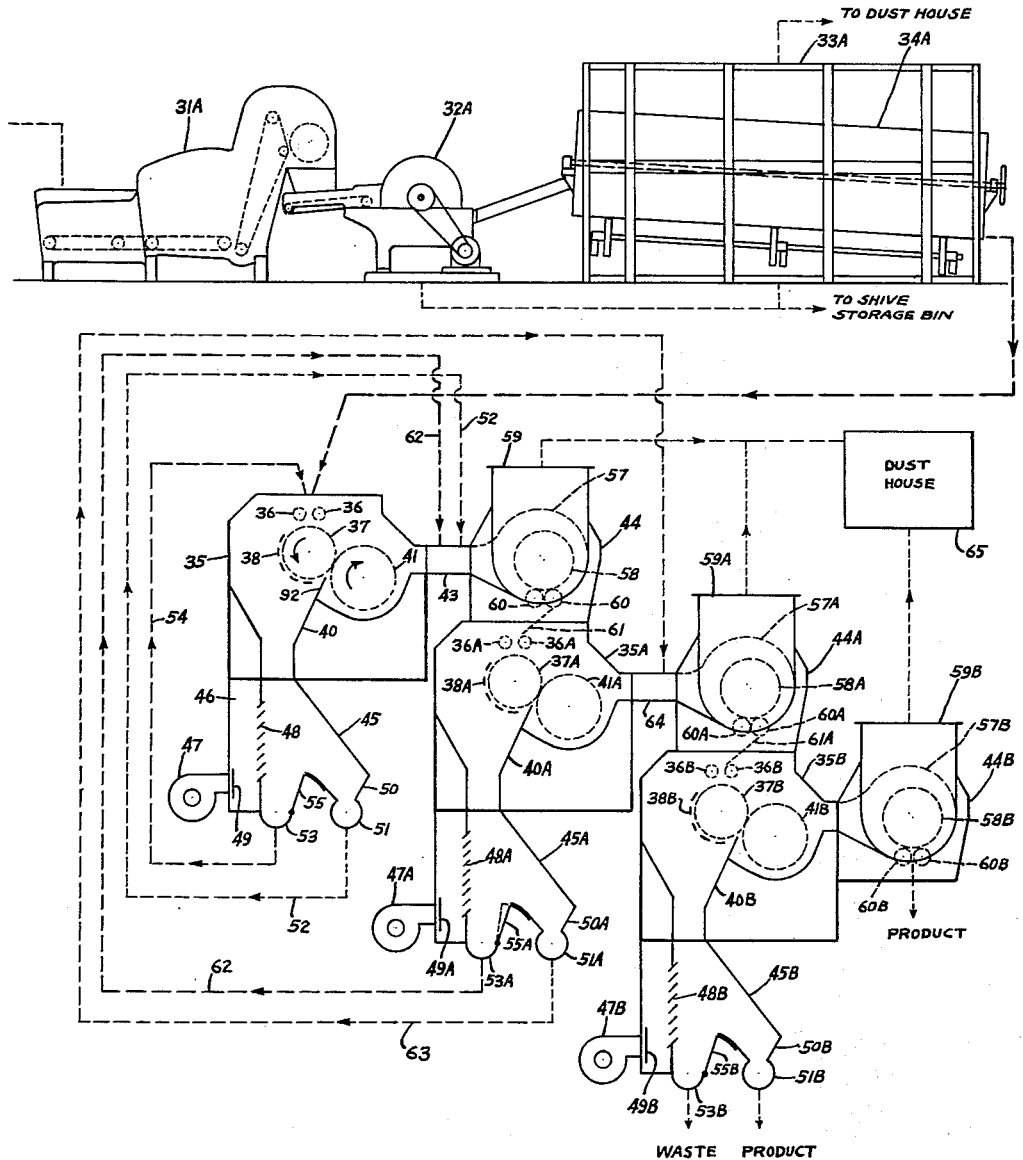

The invention is illustrated by the drawings in which the same numerals refer to corresponding parts and in which:

Figure 1 is a flow line chart showing schematically the processing apparatus and treatments at the beginning of the cleaning method according to this invention; and Figure 1A is a continuation of the flow chart showing schematically the remainder of the process.

Flax straw is made up of a pulpy cellulosic core surrounded by a thin layer of bast fibers and covered by a woody cortex, all bound together with various sugars, pectins, gums, and like mucilagenous materials. From about 15 to 20 percent of the flax straw is bast fibers, which is the desired recoverable product. The bast fibers consist of bundles of individual fibers made up of fibrils all bound together with pectins, gums, waxes, etc. In seed flax the ultimate fibrils are considered to be about one inch in length. From 70 to 75 percent of the straw is woody and shivey, pulpy and fibrous material which must be substantially completely removed from the bast fibers before they are useful for paper making. The remaining material which amounts to ten percent or less of the weight of the straw offers little difficulty in removal either in a field weathering treatment or during the process of digestion.

The bast fiber consists of relatively pure cellulose associated with other materials that are relatively soluble and therefore easily removed. The non-cellulose materials in the shives are closely combined with a relatively smaller quantity of cellulose and in practically the same proportions that are found in hard woods.

In order to facilitate the separation and cleaning of flax straw it is desirable to pretreat or condition the straw left after harvesting by subjecting it to a field weathering treatment in accordance with the teachings of my earlier Patent No. 2,741,894. Seed flax is customarily mowed and laid in swaths or condensed windrows with the heads of the grain upward and left for several days to dry before threshing. Seed flax can be harvested as a standing crop, but a windrowed, well dried crop usually produces better threshing conditions. The dried flax is then usually harvested by combining. A drawn or self-propelled combine moves across the field, gathers up the swaths of dried grain, separates the seeds from the straw, deposits the seed in a grain bin, and discards the straw in a continuous stream onto the stubble of the field.

The field weathering treatment is accomplished by allowing the straw to remain in the field where it is subjected to alternate wettings and dryings by rain and dew and sunshine and wind over a period of from several days to several weeks or even by allowing the straw to remain on the ground through the winter months. The action of the field weathering on the straw is threefold: (1) some of the water soluble mucilagenous material which holds the bast fibers together and binds the fiber bundles to the shives is dissolved out by repeated wetting; (2) some bacterial or microbiological action takes place digesting other mucilagenous material such as sugars, pectins, gums and the like; and (3) some mechanical action takes place due to the alternate swelling and shrinking caused by absorption of moisture and subsequent drying. After weathering the straw is softer and more pliable and in some instances partially opened so that the shivey material is more readily separated from the fibers than in the case of non-retted or non-weathered straw.

Field weathering is not an essential operation but it is a preferred procedure for preparing flax straw for cleaning since it greatly simplifies the problem of separation of the bast fibers from shivey material. After the field weathering treatment the flax straw is usually baled for storage or shipment to the processing plant. The straw is usually compressed into bales of either round or rectangular cross-section by pick-up balers which make bales weighing from about 40 to 60 pounds.

In some instances it may be desirable to subject the straw to a braking treatment in the field for the purpose of reducing the bulk of material which must be handled. Braking consists of a mechanical manipulation of the straw to loosen and separate some of the shivey material from the bast fibers. It is accomplished usually by passing the straw between pairs of corrugated rollers which work the straw and tend to break up the harder woody material.

Upon delivery at the processing plant or delivery from storage the bales of seed flax straw are introduced to a high capacity bale breaking and feeding unit, such as, for example a Taylor-Stiles bale breaker. The purpose of the bale breaker is simply to open up the bale and loosen up the straw from its dense compacted condition in the bale.

A typical feeding unit is shown diagrammatically at 10 in Figure 1 of the drawings. An open bale of straw placed upon the conveyor belt 11 is moved against the continuous apron 12 which has a plurality of projecting spikes which work against the open bale to pull it apart and carry the freed straw upwardly to the top of the feeder where a rotating brush cylinder 13 frees the straw from the spiked apron and discharges it to an elevating conveyor 14.

The separated straw falls from the feeder 10 onto the belt 15 of an elevating conveyor 14 and is carried upwardly between the belts 15 and 16 to a drying room 17 and discharged into another feeder 18. The straw discharged from the elevating conveyor 14 falls upon the conveyor belt 19 of the feeder 18 and is carried to the spiked aporn 20 and then up to the top of the feeder where the straw is freed from the apron by a rotating brush cylinder 21 and fed to a dryer. The dryer may be a conventional tunnel dryer 22 as shown diagrammatically or any equivalent drying means such as a Roto-Louver dryer or the like. The seed flax straw is fed directly to the moving conveyor belt 23 for passage through the dryer.

In the course of its passage through the dryer the straw is preferentilaly dried to an average of from about 1 percent to 5 percent moisture. Preferably the straw is dried to an average of from about 1 percent to 3 percent moisture. The conveying means 23 of the drying tunnel is open in the form of a perforated sheet or screen or the like which permits free circulation of a hot dry air stream through the straw to dry the straw to near bone-dry condition.

The dried straw is then optionally ozonized by passing it through a countercurrent stream of ozone. One siutable form of an ozonizer apparatus is shown diagrammatically at 24. The ozonizer comprises a vertical or inclined column provided with a plurality of baffle means 25 to slow down the passage of the dried straw through the ozonizer in countercurrent flow with a stream of ozone from any suitable source of ozone gas, such as an ozone generator whose discharge is indicated generally at 26.

The dried ozonized straw is preferably discharged directly to the conveyor belt 19A of another feeder 18A which is similar in all respects to the feeder 18 previously described. If the optional ozone treatment is omitted, the dried straw from the drying means 22 is discharged directly to the feeder 18A. The dry straw, whether ozonized or not, is next subjected to a tempering treatment wherein moisture is preferentially restored to the dried straw by means of controlled high humidity conditions.

The dried straw is fed by the feeder 18A onto the open conveyor belt or screen 28 of the tempering unit 27. The tempering unit is essentially a drying tunnel or eqivalent means to which have been added spray heads or atomizers 29 fed from a common source of steam or water 30. Where a water spray is used in the tempering unit the water is preferably heated and then is atomized in fine droplets into the chamber. An emulsion or conditioning oil may, if desired, be added to the tempering spray. Typical materials are the textile conditioning chemicals sold under the trade name "Hygrolit" or "Hygrola" for the purpose of moisture replacement, lubrication and mildew protection.

In the course of the tempering treatment the average moisture content of the seed flax straw is brought back to from about 7 percent to 14 percent and preferably to from about 10 percent to 12 percent. Because seed flax straw dries and absorbs preferentially, the moisture in the conditioned and tempered straw is relatively higher in the bast fibers and relatively lower in the shive. The result is that the fibers remain supple whereas the drier shive stays brittle.

The high humidity established in the fiber during the tempering and conditioning treatment should be maintained and therefore both close temperature control and close humidity control are necessary during the treatment of the straw after conditioning in order to maintain maximum flexibility of the fiber to limit loss of fiber and obtain maximum recovery. The relative humidity in the working areas should desirably be maintained between about 50 percent and 80 percent.

The tempered and conditioned seed flax straw is discharged to a feeder 31 similar in all essential respects to those already described. Feeder 31 discharges the straw to a picker 32 to begin the taking apart of the straw and the separation of the shive from the fiber. Suitable pickers are available commercially and a typical picker is the Fearnought. This machine acts like a coarse breaker-card in function and consists of a main rotating cylinder and several interacting working or picking rolls which act upon the straw to break up and partially separate the more brittle shivey material from the bast fibers. The shive, because it is brittle, tends to be broken up into small discrete particles which drop and are continuously removed from the bottom of the picker along with dust and dirt.

The longer more flexible fibers and the unseparated shive particles clinging to them pass through the picker and are conveyed to a duster or shaker 33. The illustrated means is a so-called "squirrel cage" duster which includes an open foraminous inclined rotating drum 34 through which the straw is passed. In its passage through the duster the fibers are continuously agitated and tumbled upon themselves, which action helps to further open the straw and to further break up and dislodge adhering shive particles. The dusty shive particles separated from the fibers in the course of their passage through the duster are dropped through the bottom of the open drum and are removed.

Instead of the illustrated squirrel cage duster a cone duster, or various designs of vibratory-sifters or screen-shakers may be used to perform substantially the same function. Sifters or shakers are less desirable since they tend to vibrate a whole mass of fibers with little or no further opening.

After discharge of the straw fibers from the duster 33 they are preferably passed through an identical feeder 31A for passage through an identical picker 32A and another duster 33A to subject the straw fibers to further opening and separating action for further removal of shive. Prior to feeding the straw to the first picker 32 the straw may, if desired, be crushed in smooth or corrugated or spiral grooved rolls to effect a partial separation of shive from fiber, but this stop may be dispensed with for economy of equipment and power with relatively little loss of fiber recovery by the use of specially modified pickers, as described.

The straw fiber from the duster 33A is fed to a lint cleaner 35, the first of a series of lint cleaners. The lint cleaner is a cotton cleaning apparatus as described in U.S. Patents No. 2,418,694 and Re. 23,044. It comprises a pair of feed rolls 36 which receives the straw fibers from the duster drum 34A and feeds them to a saw cylinder 37 mounted for high speed rotation within the lint cleaner casing. The first lint cleaner is fitted with a special beater or feeder whose function is to take irregular masses of straw fiber from the duster and level off the masses so as to provide a thin, high-speed, relatively uniform mat of straw fiber to the feed rolls of the cleaner. Mounted parallel to the saw cylinder 37 and in closely spaced relation thereto are a plurality of stripper bars 38. The bars 38 may be any desired number and are disposed in spaced relation to each other so that straw fibers caught on the saw cylinder 37 will flare outwardly and strike the bars thus being subjected to successive flailing beating actions.

The flailing beating actions of the stripper bars upon the straw fibers carried by the saw cylinder causes a further opening and breaking of the straw and dislodging of shive particles from the straw fibers. The waxy outer sheath of the stem is broken and inner shive particles adhering to the fiber bundles are violently thrown out. The major part of the trash in flax straw consists of light shive particles but it also includes pedicles, the so-called "nail-heads," which are the short stems with a pinhead end which formerly supported the flax-seed bolls. The "nail-heads" are tough and heavy with some fibers extending from their broken ends. The separated and dislodged shivey particles and other trash fall from the stripper bars into a hopper 40 for discharge from the lint cleaner. The saw cylinder 37 is operated at a relatively high speed and the relatively heavier shive particles and any other dense foreign materials, such as nail heads, move outwardly of the periphery of the saw cylinder due to centrifugal force, strike against the stationary stripper bars at high velocity and are torn from the fiber, or if the fiber is not adequately held by the saw teeth this also is separated by the impact. Material thus separated from the saw teeth drops away to the hopper-like separating chamber to be acted upon by gentle air currents in an air fractionating means. Fibers adequately held by the saw teeth resist this tearing impact of the bars and being supple from prior conditioning treatment are able to bend without breaking, thus passing the stripper bar zone and traveling to the point of doffing.

The straw fibers remaining on the saw cylinder 37 are removed by means of a doffing brush cylinder 41 which rotates in the opposite direction from that of the saw cylinder and with a substantially greater peripheral velocity than that of the saw cylinder. A wall 92 separates the brush cylinder from the lower part of the cleaner casing and extends upwardly into close proximity to the saw cylinder to prevent any shive thrown out from the saw cylinder from remixing with the fibers doffed by the brush cylinder. The rotating doffing brush cylinder 41 acts as a fan and sweeps the doffed straw fibers into a duct 43 to a condenser 44.

Under typical operating conditions the saw tooth cylinder may be operated at from about 700 to 750 r.p.m. and the doffing brush cylinder would then be operated at from about 1200 to 1400 r.p.m. Although omitted from the drawings for clarity, the doffing brush cylinder 41 is preferably provided with closely spaced shrouding around most of its periphery. According to one form of construction the air and fiber duct 43 by which the doffing brush cylinder chamber communicates with the condenser 44 intersects the chamber at about the bottom or at about the six o'clock position when viewed from the end. There has also preferably been provided a first opening in the shrouding at about the three o'clock position with a secondary stripper bar which forms the bottom of the opening. There is also provided a fiber re-entry opening in the shrouding at about the four o'clock position.

As the fibers doffed from the saw tooth cylinder are carried by the brush cylinder around its periphery they tend to stand out from the periphery due to the centrifugal effect of the rotating doffing brush cylinder. To some extent this effect is retarded by the air pressure resulting from the closely spaced shrouding surrounding the doffing brush cylinder and the projecting fibers tend to drag. When they reach the first opening in the shrouding and are released from the retarding effect of the shrouding they project radially outwardly into the path of the secondary stripper bar. The impact of the fibers striking the secondary stripper bar assists in separating any dense foreign material which may remain adhered to the fiber. The separated dirt or other foreign material is thrown outwardly where it may be collected in a dirt bin or on a moving conveyor belt or the like.

Any fibers removed from the doffing brush cylinder by the secondary stripper bar are sucked back into the doffing cylinder chamber through the fiber re-entry opening and enter duct 43 to condenser 44 with the main stream of fibers. This action occurs because of the pickup of air by the brush cylinder as it passes the two openings referred to above as the first opening and the re-entry opening. High velocity air moves into the brush cylinder chamber at these openings because of the close shrouding of the brush cylinder and the fan action of the individual brushes in their metal mounting channels, producing an effective air separating means which sucks light fiber back into the chamber while discarding heavy particles thrown out by the impact on the secondary stripper bar.

The successive beating action of the saw cylinder 37 against the striker bars 38 not only tend to open up the straw to separate the fiber bundles into individual fibers, or even ultimate fibrils, and break up shivey material but to some extent they may also tend to break up the fibers themselves. The result is that some short fiber lengths and fibrils fall intermingled with the shivey material to the hopper-like bottom of the cleaner. To effect a separation of these short fibers from the shives there is provided a separation or fractionating chamber 45 in communication with the bottom of the lint cleaner casing.

Adjacent to the separation chamber 45 there is a plenum chamber 46 into which air is introduced through a suitable fan or blower 47. The chamber 45 and the plenum chamber 46 are separated by means of an adjustable louver curtain 48. The blades of the louver curtain are movable for controlling the volume, velocity and trajectory of the flow of air from the plenum chamber into the separation chamber. A baffle 49 is preferably provided over the inlet from the blower 47 in order to assist in maintaining a uniform slightly higher air pressure in the plenum chamber.

The air from the plenum chamber is directed in an upwardly flowing stream into the separation chamber where it acts upon the stream of shivey material falling by gravity from the lint cleaner above. As the co-mingled fine short fibers and shivey material fall from the bottom of the lint cleaner they are subjected to the streams of air through the louver curtain 48 and subjected to an air fractionating action by gentle air currents.

The fibers and shivey material are dispersed in the air streams and the lighter fine short fibers unattached to any bulky or heavier shivey material are wafted by the force of the air currents into a fiber collecting hopper 50 at the bottom of one side of the separation chamber and then drawn by suction into a duct 51 from where they are recirculated along a path indicated generally at 52 and reintroduced into the cleaning system at duct 43.

The fine short fibers are accompanied by the fine dust of gum and other ligneous binders which has been produced by the action of the sharp saw teeth on the straw fibers.

It is preferable before reintroducing the short fibers into the cleaning system to pass the contents of hopper 50 through a standard sifter of fine wire mesh to collect the gum and ligneous dusts and permit their further reclamation for use. I have found that the short fiber (with dusts sifted out) thus recovered from the sifter is of highest papermaking quality. This is likewise true of the fine short "fly" fiber which is developed at the lint cleaners and which is discharged from the condenser air vents going to the dust house. To a lesser degree it is true of the fly-fiber discharge from the squirrel cage dusters. All such short fibers and fly-fiber can be utilized in papermaking if first sifted to remove the ligneous dust and particles of gums and sugars.

The heavier shivey material is less affected by the air streams and thus tends to fall more nearly directly downward. Although its downward path may be diverted to some extent by the air stream the heavy shive and some heavy fiber bundles fall into a duct 53 from where they are recirculated along a path indicated generally at 54 back to the feeder rolls 36 of the first lint cleaner 35 for a further pass through the lint cleaner and subjection to the beating action of the saw cylinder 37 and the striker bars 38 for further opening and separation of the shive and fiber. Under some processing conditions it is desirable to conduct this fraction to a separate lint cleaner unit where it is cleaned by the same action previously described before being introduced into the main stream of fiber at duct 43. This diversion avoids an undesirable heavy circulating load which otherwise would result when shivey material is reintroduced at the feed rolls 36. An adjustable hopper wall 55 provides means for varying the size of the entrance to the shive removal duct 53.

Where the shive is less dense with lighter smaller particles etc., it tends to be wafted generally in the direction of the fiber receiving hopper 50 and therefore to prevent remixing of the separated shive and fibers the entryway to the hopper 53 is made larger. On the other hand, where the shive particles are larger, denser, and heavier they tend to fall almost directly vertically downward and therefore the entryway to duct 53 may be made smaller by appropriate adjustment of the movable wall member 55. This adjustable means is of value when processing a number of varieties of straw where some batches are rank and coarse and other batches are soft and fine, as is the case with variable growing conditions of moisture, soil fertility, date of harvest and degree of field weathering.

The separating air stream wafts the intermingled fibers, dusts, etc., fairly sharply defined graduated distances depending upon the mass and density of the particles. The heaviest material is, of course, wafted the smallest distance while the lightest material is wafted the farthest. For clarity, the simplest form of fractionating means is illustrated which separates the lint cleaner waste into only two fractions. It will be readily apparent, however, that, where desired, three, four or more different fractions of material may be removed by the simple expedient of providing a plurality of side-by-side hoppers or troughs, similar to hopper 50, each provided with a conduit or other means for removal of the separated fraction. In this event the finest fractions consisting of dusts and fly fiber are simply sifted and not recirculated and other fractions consisting essentially of clean short fiber are ready for use as a papermaking material.

The airborne fibers doffed from the saw cylinder 37 and recirculated from the duct 51 are intermingled in the duct 43 and pass together as a mixture to the condenser 44. The purpose of the condenser is merely to remove the bulk of the air from the stream of airborne fibers. The preferred form of condenser shown diagrammatically at 44 includes a generally cylindrical chamber 57 in which rotates a foraminous cylindrical drum 58. The ends of the foraminous drum 58 are in direct communication with ducts 59 through which suction is applied to the foraminous surface of the drum.

The air from the airborne stream of straw fibers is sucked through the foraminous drum and deposits the straw fibers in the form of a bat around the periphery of the drum 58. A pair of doffing rolls 60 are disposed along the bottom surface of the drum 58. The doffing rollers 60 remove the bat of fibers from the condenser drum 58 and feed it to a slide 61 and to the feed rolls 36A of a second lint cleaner 35A. The second lint cleaner 35A is connected in series through the condenser 44 with the first lint cleaner 35 and is identical in its structure and operation in all respects to that already described.

The separated shivey material which is removed through duct 53A is recirculated along a path indicated generally at 62 to the duct 43 at the entrance to the first condenser 44 so that the shivey material may be subjected to another pass through the lint cleaner for further opening and separation of fibers. As pointed out previously, under some processing conditions it may also be desirable to conduct this fraction to a separate lint cleaner unit before it is introduced into the main stream of fiber to avoid a heavy recirculating load. Where this fraction is first separately cleaned it is reintroduced into the main fiber stream at duct 64. The separated fine fibers wafted into duct 51A are recirculated along a path indicated generally at 63 to the duct 64 connecting the brush cylinder chamber of the lint cleaner 35A with a second condenser 44A in series. Preferably these short fibers should be sifted to remove dusts which mingle with them at this point before reintroduction into the duct 64 or they may be removed from further cleaning and packaged for use.

The second condenser 44A is similar in structure and operation to that already described for condenser 44. The bat of fibers from condenser 44A is fed to a third lint cleaner 35B. The shivey material which is separated into duct 53B of the lint cleaner 35B is discharged to waste, or may be reclaimed for low grade uses. The fine fiber product which is separated to the duct 51B of the lint cleaner 35B is clean fiber and is recovered. The clean fiber doffed from the saw cylinder 37B by brush cylinder 41B is passed directly to a third condenser 44B and after seperaration of the air the resultant fiber bat is recoverable product.

The product from the condenser 44B may, if desired, be blended with the product recovered from the third lint cleaner 35B and separated through the duct 51B. The recovered fiber product consists of clean short length linen fibers substantially free of dirt, dust, shive, weed particles, and the like. It may be pulped or digested by conventional cooking methods well known in the papermaking arts. Under the preferred conditions utilizing as starting material in this process soft fine straw as obtained by the process of my earlier Patent No. 2,741,894, the process of this invention so thorouhly cleans and polishes the fibers that they are highly desirable for blending with other fibers, mainly cotton, and permit working on cotton processing machinery.

When growing conditions are ideal in the seed flax areas the available straw is of a long, slender character nearly equal to the fiber flax varieties and I have found it desirable to first process the long, partially cleaned fibers (as obtained by using the process of my Patent No. 2,741,894), in a flax finisher card. The card product, known as sliver, is suitable for linen yarns while the card waste can go directly into the process of this invention at lint cleaner 35.

The shivey material separated from the flax straw by pickers 32 and 32A and that removed from the bottoms of dusters 33 and 33A is recovered and conveyed to a shive storage bin, not shown. This recovered shivey material consists of short fiber length woody particles which are themselves useful in papermaking when separated from the straw fibers according to the process of this invention. These shive particles may then be digested or pulped by conventional papermaking cooking methods. The resultant digested product is to be distinguished from that over-digested product which is necessarily produced by the severe cooking which was required in prior attempts to utilize seed flax.

The dust annd "fly" fiber which rises to the top of the dusters 33 and 33A are taken off and conveyed to a dusthouse 65 along with the dust and "fly" fiber from the condenser drums of the condensers 44, 44A and 44B. The material which is recovered in the dusthouse consists primarily of extremely short fibers and pectin and gums which are in the form of extremely fine particles or dust. In spite of their short length these fibers may also be utilized in papermaking and other uses such as fine polishing abrasives, etc. For some purposes it may also be desirable that the gum and pectin be separated from the fibers and separately utilized. The gum and pectin dust may be separated from the fibers by means of the use of a screen dusthouse having mesh selected to permit passage of the pectin and gums in dust form but to retain the short cellulose fibers. Instead of a dusthouse a conventional cloth dust filter may be used to recover the airborne short fibers. A particularly suitable cloth filter is the Hersey, "Day R-J," or reverse-jet filter as described in U.S. Patent No. 2,731,107. Modified sifters of the "Roball" or "Rotex" type (Orville-Simpson Co.) are also useful, as well as gyratory and vibratory sifters (Allis-Chalmers Co.).

With the exception of the separating means at the bottom of the lint cleaners all of the machines used in the mechanical cleaning process described are per se old in either the cotton or wool processing industries, although with small but effective modifications to permit them to handle long fibers. What applicant has done is to arrange conventional machines in a new and inventive combination to adapt them to perform a new sequence of operations for the processing of seed flax straw with the production of unusual and unexpected results. In other words, although some of the machines used in applicant's mechanical cleaning process have been utilized in the processing of wool or in the processing of cotton they have never been combined to perform the described sequence of steps on any fibers prior to this invention.

The essential differences in nature between wool and cotton fibers on the one hand and linen fibers from seed flax straw on the other are readily apparent. The problems of cleaning are entirely different. Cleaning of wool and cleaning of lint cotton involves merely the separation of a relatively minor percentage of foreign matter from the wanted fibers. The recovery of linen fibers from seed flax straw, on the other hand, involves first the opening of the straw to liberate the fibers and the separation of adhering foreign matter which is present in the amount of from 4 to 6 times the weight of the recoverable fiber.

It is to be understood that the arrangement of the processing equipment depends largely upon the layout of the space available at the processing plant. In many instances the use of separate feeders may be unnecessary if the machines may be arranged so that the discharge from one operating unit feeds directly to the intake of the next operating unit. As an example, the dried straw may be fed directly from the bottom of the ozonizing column 24 into the feed hopper of the tempering unit 27 without the interposition of feeder 18A provided space conditions permit such an arrangement of equipment. The lint cleaner units 35, 35A and 35B are preferably arranged as illustrated diagrammatically where this arrangement is feasible so that the straw fibers cascade naturally down through the series of cleaners.

In order that the mechanical cleaning process of this invention may be economically feasible it is desirable that the process be operated continuously. It will be readily understood, however, that except for economy of operation essentially the same results would be obtained from a batch operation. For example, instead of having a series of pickers and dusters the same straw could be recirculated through a single picker and a single duster. Similarly, instead of employing a plurality of lint cleaners and condensers in cascading series the flax fiber could, if desired, be recirculated through a single cleaner and condenser, but with loss of economic advantage.

The cleaned short fiber produced by this mechanical cleaning method can be readily digested or otherwise chemically purified for other purposes than papermaking, such as the production of non-woven fabrics, sanitary and absorbent fibers, cellulose sponge fibers, and the like. Because the essentially shive-free flax fiber produced by the mechanical cleaning method does not require the drastic chemical digestion formerly necessary, the fibers resulting from my process may be chemically treated on a continuous process line. Where formerly the presence of substantial quantities of ligneous matter, weed fragments and shive particles required digestion with harsh caustics at elevated temperatures and pressures in pressure vessels which necessarily entailed a batch operation, it is now possible to adjust the chemical concentration and to use open kettle containers for shorter periods of time. This, followed by bleaching in open vessels, produces a thoroughly delignified and bleached fiber in one continuous "scouring train" type of operation.

The presently available equipment used for cleaning wool, known as a "scouring train," arranged in a series of "bowl" sections with intermediate squeeze rolls is ideally suited for this continuous type of boil and bleach operation. The short flax fiber is handled without difficulty by this equipment because of its gentle rake action and no roping or winding is experienced. Preferably the initial bowl is devoted to a hot water rinse to remove water soluble pectins, wax, and other lignin fractions from the fiber.

The practical train in the continuous operation is comprised of one or two caustic boil bowl sections alternated with or followed by one or two bleaching bowl sections. This material when dried in standard drying equipment of the tunnel type or the like delivers a well opened, non-felted, clean bleached linen fiber suitable for purposes such as paper pulp, blending with other fibers, production of non-woven fabrics, sterile absorbent pads, or the like.

The invention is further illustrated by the following non-limiting examples:

*Example I*

A large field of seed flax was harvested by swathing, drying and combine-harvesting and the straw thrown from the combine was allowed to weather in the field for several weeks during which rainy and dry periods alternated. Experience directed the time when the weathered straw was in best condition for baling. Taken to the pilot plant the bales were opened manually since use of heavy bale-breaker equipment was not practical on small batch testing. The straw was dried to a moisture content of 3% in an oven dryer, after which it was tempered in a controlled humidity room to give a moisture content of 10% (oven dry basis) and the processing was then carried on in a controlled atmosphere with a relative humidity range of 60 to 80% and temperature range of 65 to 80 degrees F.

Using 100 pound lots to facilitate easy evaluation of yield at the several processing stages the following values show an average of many trials:

Weathered and tempered straw—100 lbs. (10% moisture on oven dry basis included in weight).
Picked and dusted straw—35 to 45 lbs.
Cleaned fiber—17 to 20 lbs. (including 7 to 10% moisture in weight).

*Example II*

Another field in a different growing area was similarly harvested without allowing weathering to take place because of climatic conditions not being favorable at that time and place. Loose, dry straw was taken on hay racks to the pilot plant where its moisture was determined to be 3%. Batch portions of 40 lbs. each were subjected to the actions of a dilute ozone atmosphere produced by a Welsbach ozone generator. The straw was allowed to remain in the ozonizing chamber for a period of 2 hours, after which the generator was stopped, the chamber was purged with air and the straw was removed. The ozone generator produced a 1 to 2% concentration of ozone which was reduced to 0.01% to 0.04% concentration by a blending circuit which admitted room air to the feeding pipe running to the ozonizing chamber in which the straw was deposited. No visual change was noticeable when the straw was removed. However, comparison with straw not subjected to the ozone atmosphere showed upon processing that a softening or de-lignification effect had been produced. It is believed that some of the waxes and gum were oxidized and lost their binding action to some degree, thereby permitting the mechanical processing equipment to more completely open the fiber bundles and beat out or pick out the shivey material portion. This action is similar to the softening action of weathering in which moisture and bacterial and mold action wash off or consume some of the soluble sugars and pectin and the gum and waxes.

Using 40 lb. test lots the average results were as follows:

Ozonized straw—weight 40 lbs. (3% moisture on oven dry basis included)
Tempered straw—weight 42.7 lbs. (10% moisture included)
Picked and dusted straw—weight 15 to 19 lbs.
Cleaned fiber—weight 7 to 8½ lbs. (7 to 10% moisture included)

*Example III*

A small field of seed flax straw left out all winter under a snow blanket and in early spring subjected to many soaking rains and badly beaten down into the stubble was lifted as soon as the field could be driven on and sample lots were taken to the pilot plant. The straw was a light grey color on the upper surface of the field masses and a coffee brown underneath near the ground. Some opening and even bleaching on the upper portion of the masses was evident. No ozonizing was carried out and only a short time residence in the humidified atmosphere of the processing area was given the straw. Upon picking, dusting and cleaning a beautiful light silver grey, almost hair-like long fiber was produced, using only one pass through a single cleaner unit.

The average results based upon several batch samples were as follows:

Weathered straw—weight 50 lbs. (7 to 10% moisture included)
Picked and dusted straw—weight 12 to 15 lbs.
Cleaned fiber—weight 10 to 13 lbs. (including 7 to 10% moisture)

The average yield from these weathered sample batches was from 20 to 26%, based upon the weight of the weathered straw. These high yields are understandable when one realizes that most of the original soluble content of the straw is removed during weathering.

*Example IV*

Because of the long, soft fiber obtained on the trials of Example III it was decided to subject the weathered straw to the mechanical processing treatments of my earlier Patent No. 2,741,894. A 50 lb. lot of the weathered straw was broken on a Belgium flax brake and scutched in an Etrick tow scutcher and then carded on a flax finisher card with excellent results, as follows:

Weathered straw—weight 50 lbs. (10% moisture included).
Broken and softened tow—weight 12.5 lbs. (25% yield).
Carded fiber—weight 9.4 lbs. (18% yield).

Experts in the linen cloth manufacturing field upon being shown this card sliver were frankly dubious that it could have been made from the Minnesota seed flax straw waste. Some of this card fiber was subsequently drafted, spun and made into yarn of all linen and of part linen blended with cotton on the cotton system. Samples of cloth were woven, dyed and finished with excellent results as to hand and appearance in the coarser counts.

The card waste was taken to the pilot plant for test on salvaging of the short fiber from the shive fragments and seed ends which the card had rejected. It was found that the short fibers were easily accepted by the lint cleaner and with the supple condition of the fiber there was little fiber breakage. Almost 80% of the short fiber was recovered from the lint cleaner as a valuable paper fiber or useful as a blend with cotton fiber of essentially the same length.

Card waste—weight 3 lbs.
Lint cleaner product—weight 2.4 lbs. (some dust and fly loss estimated at 0.4 lbs).

*Example V*

To gain information of an economic nature prior to start of any commercial operation trials were made of harsh, dry, non-weathered straw and of stunted straw which grew under nearly drought conditions during the early spring and summer. In spite of both of these extreme conditions it was still possible to clean up the fiber, though not with the best yield. A 100 lb. lot of dry, hard, bright yellow straw containing 4% moisture and not subjected to any tempering treatment was mechanically processed according to this invention. The picked and dusted straw amounted to 30 lbs. The yield of clean fiber amounted to 14.7 lbs., but some gums and lignin were still noticeable.

For comparison, a batch of 100 lbs. of stunted straw which was short and contained a large percentage of branches as compared to straight stems was mechanically cleaned. This straw had been weathered according to the process of my earlier patent and contained about 8% moisture. The straw was broken and scutched, much actual field soil being beaten off in this step. The weight of the carded sliver was 9 lbs. The fiber was short due to extremely short cut stems and yield was low because of higher percentage of seed branches as compared to stems. A card rejects all short fiber and seed ends along with shivey material. The card waste which amounted to over 50% of the tow fed to the card was accordingly passed through the lint cleaner line and the results were satisfactory. From a batch of card waste weighing 10 lbs., 4½ lbs. of clean fiber was obtained.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of mechanically cleaning fibers of seed flax straw which comprises mechanically working the straw to initiate opening thereof and separation of shive from the fiber, subjecting the mechanically worked straw to a plurality of successive flailing beating actions to further open the straw and dislodge shive particles from the fibers, separating the dislodged shive particles and recovering the clean flax fiber.

2. The method according to claim 1 further characterized in that said mechanically worked straw fibers are subjected to a plurality of cleaning treatments, each including successive flailing beating actions, entrainment of cleaned straw fibers in an air stream and gravity separation of dislodged shive particles followed by separation of air from the resulting airborne stream of cleaned straw fibers.

3. A method according to claim 1 further characterized in that the dislodged shive particles from the successive flailing beating actions are subjected to the action of a cross current of air to remove and separate any loose but intermingled short fibers from such shive and the shive is then recirculated for further successive beating action.

4. A method of mechanically cleaning fibers of seed flax straw which comprises conditioning the straw for cleaning by preferentially drying said straw and preferentially restoring moisture to the fiber portion of said straw, subjecting the thusly conditioned straw to a mechanical working operation to initiate opening of the straw and separation of shive from the fiber, subjecting the thusly partially opened straw to a mechanical separation to remove the broken and dislodged shive particles, subjecting the partially cleaned straw to a pluraltiy of successive beating actions to further open the straw and dislodge shive particles from the fibers, separating the dislodged shive particles and recovering the clean flax fiber.

5. A method according to claim 4 further characterized in that the flax straw is initially dried to an average of from about 1 percent to 5 percent moisture.

6. A method according to claim 4 further characterized in that the straw is tempered by restoring the average moisture content of the straw to from about 7 percent to 14 percent.

7. A method according to claim 4 further characterized in that the dried straw is subjected to contact with an atmosphere of ozone prior to restoration of its moisture content.

8. A method according to claim 4 further characterized in that the straw is subjected to a plurality of mechanical picking operations, each followed by a mechanical separation of shive particles dislodged from the fibers of the straw.

9. A method according to claim 4 further characterized in that said partially cleaned straw fibers are subjected to a plurality of cleaning treatments, each including successive beating actions and gravity separation of dislodged shive particles and followed by separation of air from the resulting airborne stream of cleaned straw fibers.

10. A method according to claim 4 further characterized in that the dislodged shive particles from the successive beating actions are subjected to the action of a cross-current of air to remove and separate any loose but intermingled short fibers from said shive and the shive is then recirculated for further successive beating actions.

11. A continuous method of mechanically cleaning fibers of seed flax straw for papermaking and the like which comprises continuously conditioning the straw for cleaning by preferentially drying the straw to an average moisture content of from about 1 percent to 5 percent and then tempering the straw by preferentially restoring moisture to the fiber portion of said straw to an average moisture content in the straw of from about 7 percent to 14 percent; subjecting the thusly conditioned straw to a plurality of mechanical picking operations to initiate opening of the straw and separation of shive from the fiber, after each of said picking operations subjecting the thusly partially opened straw to a mechanical separation to remove the broken and dislodged shive particles; subjecting the partially cleaned straw to a plurality of cleaning treatments, each including successive beating actions to further open the straw and dislodge shive particles from the fibers and separation of air from the resulting airborne stream of cleaned straw fibers; separating the dislodged shive particles from the beating actions by gravity and recovering the clean flax fiber.

12. A method according to claim 11 further characterized in that the dried straw is subjected to continuous contact with a countercurrent stream of ozone prior to restoration of the straw's moisture content.

13. A method according to claim 11 further characterized in that the gravity separated dislodged shive particles from the successive beating actions are subjected to the action of a cross-current of air to remove and separate any loose but intermingled short fibers from said shive and the shive is then recirculated for further successive beating actions.

14. A method according to claim 13 further characterized in that the short fibers separated from dislodged shive particles from the beating actions are recirculated for further successive beating actions.

References Cited in the file of this patent

UNITED STATES PATENTS

| | | |
|---|---|---|
| 824,243 | Hollier | June 26, 1906 |
| 1,111,027 | Lacroix | Sept. 22, 1914 |
| 1,239,667 | Brolin | Sept. 11, 1917 |
| 2,402,634 | Kaiser | June 25, 1946 |
| 2,446,055 | McLaurin et al. | July 27, 1948 |
| 2,452,533 | Wells | Oct. 26, 1948 |